United States Patent [19]

Takemura et al.

[11] 4,092,930

[45] June 6, 1978

[54] GUIDE FOLLOWABLE AND MANUALLY STEERABLE VEHICLE OF A TRANSPORTATION SYSTEM

[75] Inventors: Tooji Takemura; Shigeru Saitoh; Mitsuharu Hamada, all of Yokohama, Japan

[73] Assignee: Nissan Motor Company Limited, Japan

[21] Appl. No.: 686,084

[22] Filed: May 13, 1976

[30] Foreign Application Priority Data

May 19, 1975  Japan .................................. 50-58739

[51] Int. Cl.² ............................................. B62D 1/26
[52] U.S. Cl. .................................. 104/247; 104/245; 180/131
[58] Field of Search ...................... 104/242, 244.1, 245, 104/247, 119, 120; 105/215 R, 144, 145; 92/53; 180/79, 131, 145

[56] References Cited

U.S. PATENT DOCUMENTS

| 1,234,427 | 7/1917 | Vikturek | 104/244.1 |
| 1,776,940 | 9/1930 | Willrodt | 104/244.1 |
| 3,593,667 | 7/1971 | Morris | 104/247 UX |
| 3,664,636 | 5/1972 | Sherrill | 92/53 |
| 3,977,487 | 8/1976 | Katayose et al. | 104/247 X |

*Primary Examiner*—Randolph A. Reese
*Attorney, Agent, or Firm*—Robert E. Burns; Emmanuel J. Lobato; Bruce L. Adams

[57] ABSTRACT

A guide follower of a vehicle for a transportation system is coupled to an onboard steering linkage by a bendable cable or equivalent. The bendable cable is taut to transfer the guide following movement of the guide follower to the steering linkage and is relaxed to disconnect the movement transmitting connection between them.

2 Claims, 5 Drawing Figures

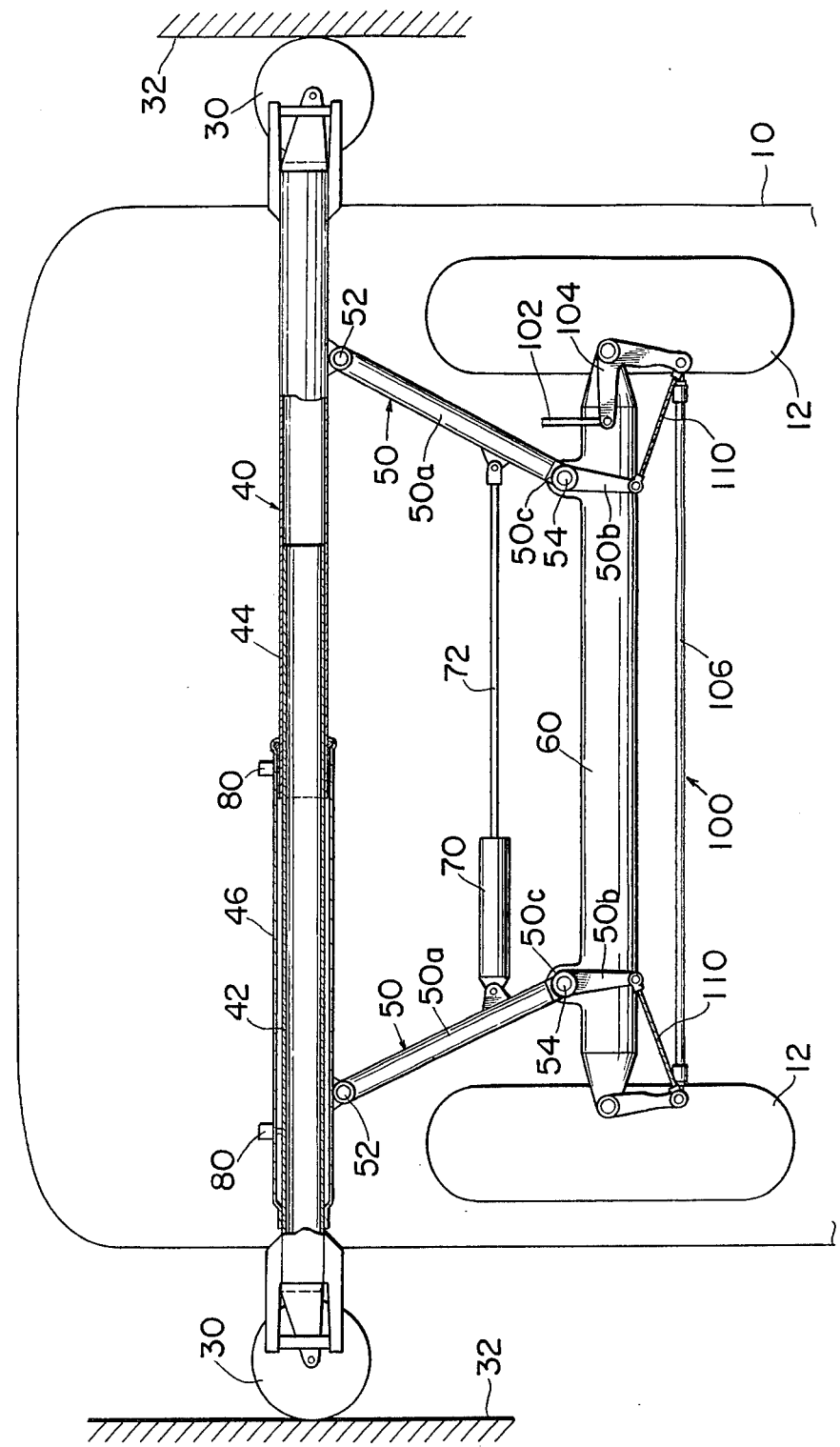

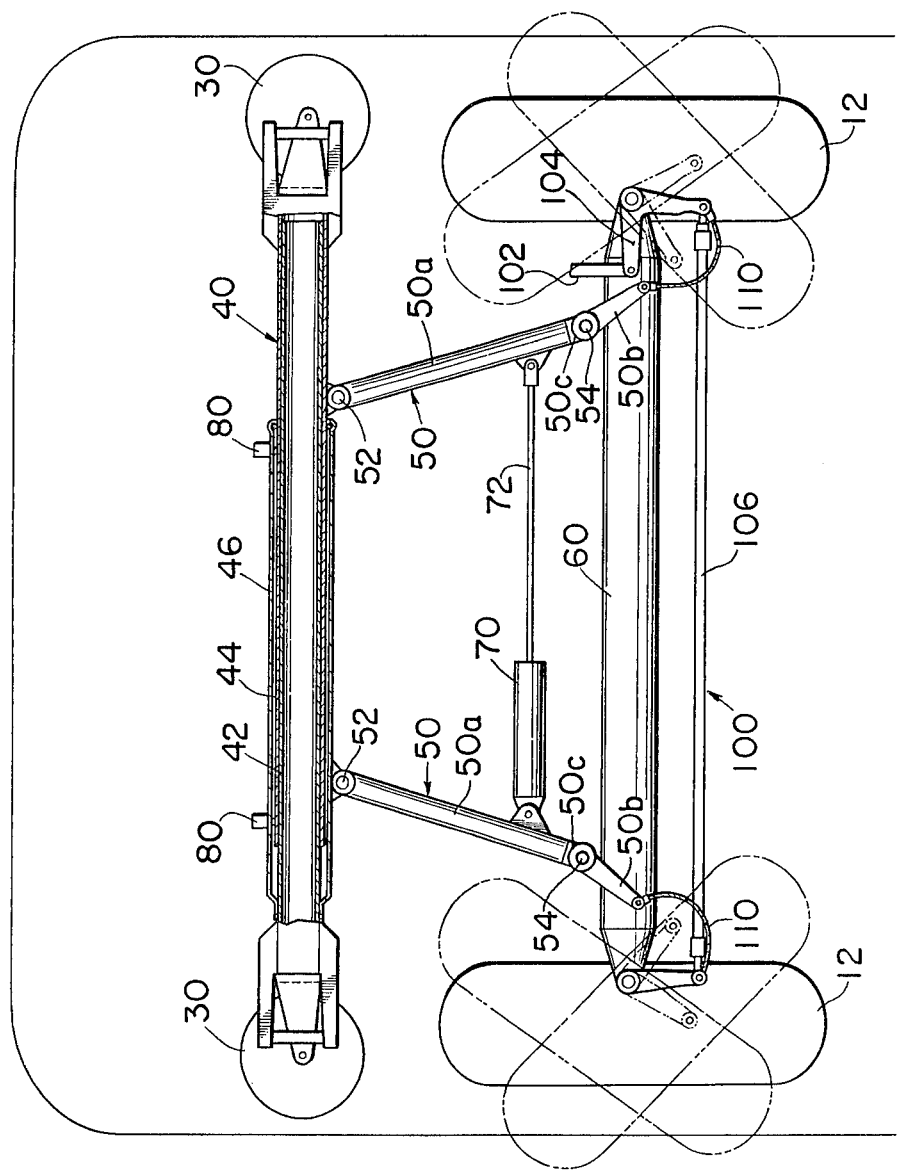

GUIDE FOLLOWABLE AND MANUALLY STEERABLE VEHICLE OF A TRANSPORTATION SYSTEM

BACKGROUND OF THE INVENTION

This invention relates to a transportation system in which a vehicle is steered optionally either by means of a track guidance or by onboard manual steering means and particularly to an improved coupling structure connecting a track following mechanism to the steering means. Such vehicles used with the transportation system may be driven and steered along a normal roadway in the manner of a bus, or along a stationary guide track or laterally disposed guide surfaces defining the path of the vehicle.

An arrangement is known where a guide follower mechanism generally in the form of a wheel on each side of the vehicle rolls along the corresponding guide surface of the guide track. The guide follower wheels are operatively connected with the linkage of the onboard steering mechanism to transmit the trackfollowing rotation of the guide follower wheels on the guide surfaces. When the vehicle is steered by the motorist by means of the conventional onboard steering mechanism along a normal roadway, the guide follower wheels are out of engagement with the guide surfaces and can preferably be stored in a retracted position in a suitable space under the vehicle body. The operative connection between the guide track and the steering linkage is then cut off enabling manual onboard steering.

The operative connection between the guide wheels and the steering linkage is usually effected by heavy and bulky means such as a mechanical clutch, which is likely subject to frequent mechanical troubles and rattling noises.

SUMMARY OF THE INVENTION

A primary object of this invention is therefore to eliminate the drawbacks accompanying the known arrangement as above by providing an improved and advantageous transportation system with a vehicle of the aforementioned character.

Another object of this invention is to provide a simpler, lighter and longer lasting construction of coupling means between the guide follower mechanism and the steering linkage carried by the vehicle of the transportation system of the aforementioned character.

BRIEF DESCRIPTION OF THE DRAWINGS

The foregoing and other objects, advantages and features of this invention will become apparent as a detailed explanation of a preferred embodiment thereof is given in the following description with reference to the accompanying drawings, in which:

FIG. 3 is a partially sectional and partially top plan view of a transportation system with a vehicle carrying a guide follower mechanism and a steering linkage according to a preferred embodiment of this invention.

FIG. 5 is a view similar to FIG. 3 but shows a guide follower mechanism in an inoperative position.

DESCRIPTION OF THE PREFERRED EMBODIMENTS

Figure 1:
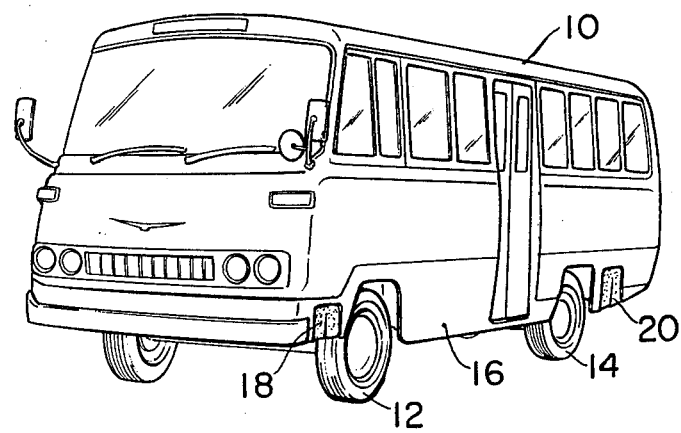
FIG. 1 is a perspective view generally showing a body of a vehicle for a transportation system according to this invention.

Throughout the Figures, like reference characters indicate like and corresponding parts of the vehicle and system of this invention.

With reference to FIG. 1, the vehicle is of generally conventional configuration and has a body 10 with four tired road wheels which are arranged in the usual rectangular relationship, the front wheels 12 steering and the rear wheels 14 driving the vehicle.

Figure 2:
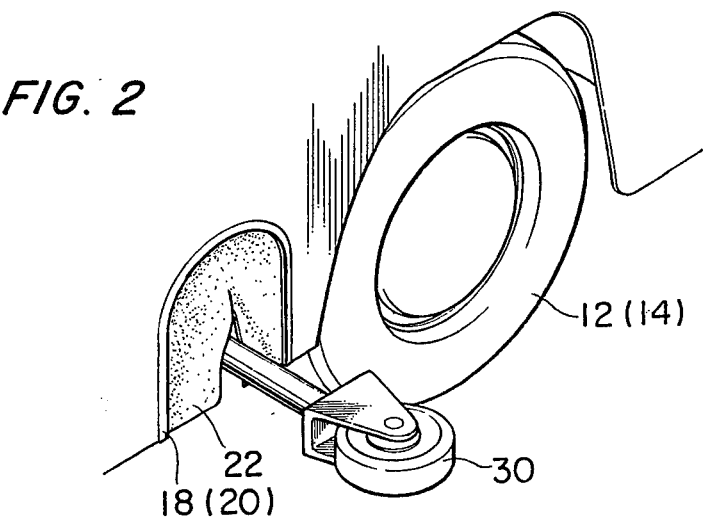
FIG. 2 is an enlarged perspective view of part of FIG. 1 showing a guide follower wheel in its operative position.

According to this invention, the body side panel 16 of the vehicle at its bottom defines window-shaped relatively large notches behind which suitable spaces are maintained on the respective sides of the vehicle. Preferably, four notches are provided, two 18 for the front and two 20 for the rear of the vehicle. The notches 18 and 20 are covered with split sheets 22 of rubber or the like, preferably colored as the vehicle body itself for good appearance thereof. As is clearly seen in FIG. 2, a guide follower wheel 30 extends through the sheet 22 of each notch 18 or 20 laterally outwardly of the vehicle body and is withdrawable behind the notch when not in use, as will be apparent from the succeeding description.

Figure 4:
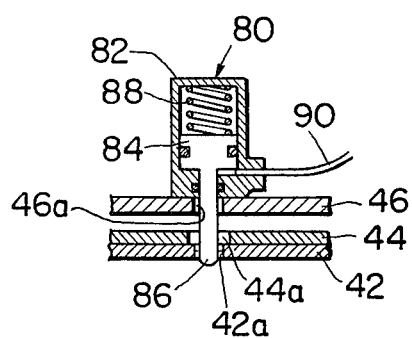
FIG. 4 is an enlarged sectional view of part of FIG. 3.

The preferred embodiment of this invention is illustrated in most detail in FIGS. 3 to 5. Since the substantially same description applies to the front and rear of the vehicle, the following explanation is given only in connection with the front of the vehicle for brevity. The two guide follower wheels 30 are carried by the opposite ends of a laterally extending supporting arm 40, each wheel being rotatable about a substantially vertical axis with respect to the vehicle body along a corresponding guide surface 32 of a guide track.

The supporting arm 40 in the illustrated embodiment consists essentially of three telescopic tubes 42, 44 and 46 in fluid-tight and dust-proof engagement with one another. The innermost one 42 of them extends leftwardly in the drawing and carries at its outer end the lefthand wheel 30. The rightwardly extending intermediate tube 44 carries at its outer end the righthand wheel and is telescopically movable on and relative to the inner tube 42. Of course the inner tube and the intermediate tube may be reversely arranged so that the former carries the righthand wheel and the latter the lefthand wheel. The outer or envelope tube 46 extends parallel with the inner tube 42 and is at its outer end fixed to the same adjacent the wheel carrying end. Accordingly, the outer tube 46 is telscopically movable with the inner tube 42 on and relative to the intermediate tube 44.

Two laterally spaced toggle levers 50 are fastened respectively to the intermediate tube 44 and the outer tube 46 pivotally about substantially vertical pivot axes 52. Thus, the levers 50 are swingable about the axes 52 upon relative telescopic movement of the intermediate and outer tubes. Each lever is separated into a longer arm 50a and a shorter arm 50b at an elbow point 50c, at which the lever is carried by a pivot pin 54 fixed to a suitable part of the vehicle body as at a front axle 60.

Designated by numeral 70 is a hydraulic cylinder anchored to the longer arm 50a of one lever 50 for effecting the relative telescopic movement of the tubes. The cylinder as is conventional accommodates a fluid operable piston (not shown), from which a piston rod 72 extends outwardly of the cylinder and is at its outer end fixed to the longer arm 50a of the other lever 50. The piston is moved by an operating pressurized fluid delivered from a non-illustrated source of fluid so that the piston rod 72 is extended outwardly of and withdrawn into the hydraulic cylinder 70. Toggle levers 50 are thus pivoted about their respective pivot axes in the opposite directions to each other to cause the telescopic movements of the tubes, as will be later described.

In order to lock the telescopic tubes preventing their telescopic movement, two or more hydraulic lock mechanisms 80 are attached to the supporting arm 40. FIG. 4 shows in detail a preferred arrangement of any lock mechanism 80 employed where a conventional hydraulic cylinder 82 is mounted on the outer tube 46. The cylinder 82 defines a fluid chamber (no number) in which a fluid operable piston 84 is reciprocally accommodated. A plunger 86 of the piston 84 extends outwardly of the cylinder and is loaded by a spring 88 acting on the upper surface of the piston 84 to pass throughout the bores 46a, 44a and 42a respectively formed at the outer tube 46, intermediate tube 44 and the inner tube 42. When the release of the lock mechanism is desired, pressurized fluid is delivered through a hose 90 to the fluid chamber to act upon the underside of the piston 84, whereupon the plunger 86 is withdrawn from the bores of the tubes into the cylinder 82 against the spring action. The tubes are thus freely movably relative to or together with one another to allow the length of the supporting arm 40 to be adjusted.

Referring again to FIG. 3, the vehicle is equipped with a conventional manual steering mechanism with a steering linkage 100. For brevity of explanation, only some elements of the steering linkage which are deemed necessary for better understanding of this invention are herein shown, such as a drag link 102 leading from a Pitman arm (not shown), and a steering knuckle arm 104 one for each road wheel which are interconnected by means of a tie rod 106.

According to this invention, the lower ends of the lever shorter arms 50b are connected to the respective ends of the tie rod 106 together with the knuckle arms 104 by means of flexibly bendable coupling members 110 such as cable, wire, rope, chain, band steel or the like. In the position of the toggle levers illustrated in FIG. 3, the bendable cables or lines 110 are in a taut condition, and are relaxed or slack as shown in FIG. 5 when the toggle levers retract the follower guide wheels.

In operation of the embodiment constructed as above, as the piston rod 72 is extended from the cylinder 70, the toggle levers 50 are swung about their respective pivot pins 54 outwardly in the opposite directions. The levers at the same time pivot about the vertical axes 52 urging the intermediate tube 44 and the cutter tube 46 with the inner tube 42 telescopically outwardly of one another. As a result, the supporting arm 40 assumes an operative projected position as in FIG. 3 in which each guide follower wheel 30 is in contact with the corresonding guide surface 32. The lock mechanisms 80 are then actuated to take the position in FIG. 3 preventing the relative telescopic movement of the tubes, whereby the supporting arm 40 acts like a single rigid bar. The coupling cables 110 are then tightened by the toggle levers as has been previously mentioned. Thus, the track following turning movement of both guide follower wheels is transferred to the tie rod 106 of the steering linkage through the supporting arm 40, toggle levers 50 and the taut coupling cables 110, enabling the vehicle to be properly steered along the guide track.

When it is desired to drive the vehicle along a normal roadway, pressurized fluid is delivered through the hose 90 to the hydraulic cylinder 822 to withdraw the plunger 86 from the bores 42a, 44a and 46a. The hydraulic cylinder 70 is then manually operated to retract the piston rod 72, whereupon the toggle levers 50 are swung about the pivot axes 52 and about the pivot pins 54 inwardly toward each other. Thus, the supporting arm 40 assumes its inoperative retracted position as in FIG. 5, withdrawing the guide follower wheels 30 behind the notches 18. The lock mechanisms are again actuated to maintain the supporting arm in this position.

As a result of the above operation, the bendable coupling members 110 are relaxed so that movement of the guide follower wheels, if any, is no longer transferred to the steering linkage. The vehicle is manually steered by the onboard steering mechanism without being influenced by the track following mechanism.

It will be readily understood from the above description that this invention enables a highly simplified connection of the guide follower mechanism to the onboard steering assembly, which will result in several desirable properties of the vehicle being employed with the transportation system of the aforementioned character, such as lightness, compactness, easiness in manufacturing, installing and maintaining, and reduction in mechanical noise during operation of the vehicle, etc.

What is claimed is:

1. In combination, a vehicle having a steering mechanism driveable on highways and roads, an apparatus for converting the vehicle for use on a guide track system comprising, a set of guide-follower wheels having vertical axes of rotation, means for movably mounting said guide-follower wheels on said vehicle for selective travel on a guide track system having laterally spaced guide surfaces relative to a path the vehicle is to travel and for following the guide surfaces under automatic control of the guide-follower wheels, means for selectively projecting the guide-follower wheels outwardly laterally of the vehicle for engagement in use on the guide surfaces laterally of a path of travel the vehicle is to travel and for retracting the guide-follower wheels to a retracted position under the vehicle, said means for projecting and retracting the guide-follower wheels including a plurality of relatively slidable, telescopically arranged tubes, pivotal toggle arms pivotally connected to said tubes for actuating said tubes to an extended position and to a retracted position, and a hydraulic cylinder for selectively actuating said toggle arms, and means for automatically transmitting guide movement of said guide-follower wheels to the manual steering mechanism of the vehicle on which said apparatus is mounted to effect guiding of the vehicle along said path, said means for transmitting movement comprising flexible control means connected to said pivotal toggle arms and connected in use to the vehicle steering mechanism and including means rendering said flexible means taut when said guide-follower wheels are projected to effectively operate the steering mechanism and for rendering said flexible means slack for rendering the control means ineffective when the guide-follower wheels are retracted.

2. The combination according to claim 1, in which said means for selectively transmitting movement to said steering mechanism comprises means for rendering said tubes non-telescopic when in a projected position and means responsive to the movement of said toggle arms, and said control means comprising a flexible member connected to the last-mentioned means to respond to movement of said toggle arms when said tubes are nontelescopic and move jointly axially is response to follower movement of said guide wheels.

* * * * *